UNITED STATES PATENT OFFICE.

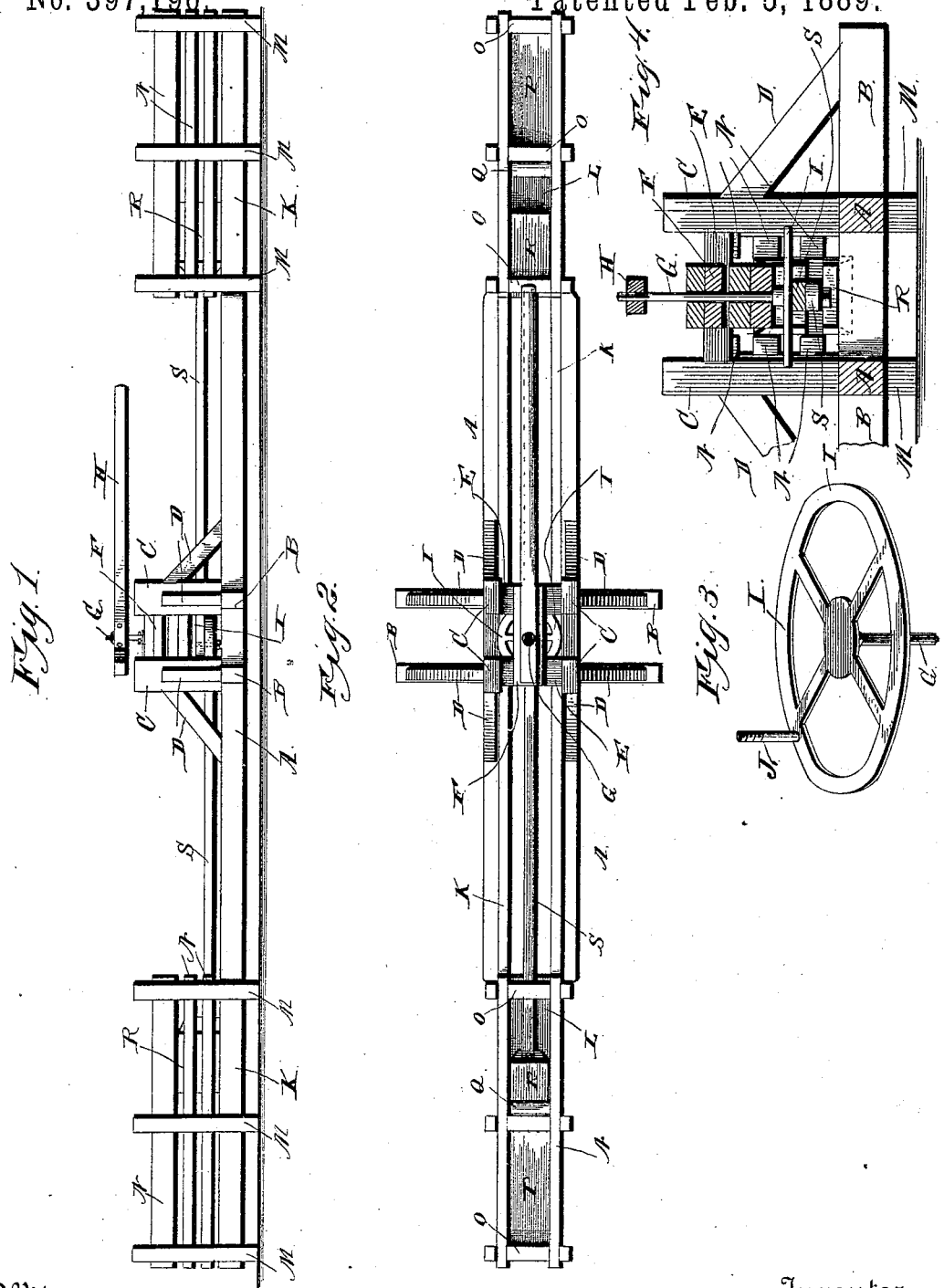

THOMAS T. MAYES, OF BELTON, TEXAS.

HAY-PRESS.

SPECIFICATION forming part of Letters Patent No. 397,196, dated February 5, 1889.

Application filed August 16, 1888. Serial No. 282,847. (No model.)

*To all whom it may concern:*

Be it known that I, THOMAS T. MAYES, a citizen of the United States, residing at Belton, in the county of Bell and State of Texas, have invented new and useful Improvements in Hay-Presses, of which the following is a specification.

My invention relates to improvements in hay-presses; and it consists in certain novel features hereinafter described and claimed.

In the accompanying drawings, Figure 1 is a side view of my improved press. Fig. 2 is a plan view, and Fig. 3 is a detail view, of the drive-wheel, showing it inverted. Fig. 4 is a central vertical section.

In carrying out my invention I employ two longitudinal beams, A A, which are connected near their centers by cross-bars B B, the ends of said cross-bars projecting past the beams. On the upper side of the beams A A, at the points of intersection of said beams and the cross-bars B B, I erect standards C, which are braced by the inclined braces D D, extending upward from the beams and the bars to the standards, as shown. The standards are connected in pairs by the transverse beams E E, and upon these beams E E, I secure the bearing-bars F, in which is journaled the king-bolt G, having the sweep H secured on its upper end, as shown. To the lower end of the king-bolt I secure a drive and fly wheel, I, which has a depending crank-pin, J, on its under side near its periphery.

To the inner sides of the beams A, I secure the parallel beams K K, which project from the ends of the said beams, and between the extremities of the beams K K, I secure the flooring L L, which forms the bottom of the baling and discharge chambers. To the sides of the beams K K, I secure the standards M M, which project upward a suitable distance and have secured to their inner sides the longitudinal bars or rails N, forming the sides of the baling and discharge chambers. The roof of these chambers is formed by cross-bars O, secured between the upper rails, N, and closed boards P, secured to said cross-bars. A transverse roller, Q, is journaled between the rails N near the rear end of the baling-chamber, so as to even the upper side of the bale as it is forced therefrom.

R designates the plungers, which are pivoted to the outer ends of pitmen S, which have their inner ends pivoted upon the common crank-pin J, depending from the drive-wheel I.

In operation the hay is fed alternately into the press-boxes at the opposite ends of the press, and the sweep is rotated continuously in one direction. As the sweep rotates, the king-bolt and drive-wheel will be rotated in the same direction, and the pitmen thus caused to reciprocate, as will be readily understood, one of the plungers being withdrawn as the other is forced inward. By this arrangement as the bale is discharged from one of the press-boxes the plunger in the other press-box is withdrawn, thus clearing the same ready to receive a new supply of hay to form another bale.

From the foregoing description it will be seen that I have provided an extremely simple hay-press, the plungers being connected to a common drive-wheel, so as to counterbalance each other, and thereby secure free and easy movement of the parts in operation. The drive-wheel and king-bolt are thoroughly inclosed and protected by the standards and the cross-bars between the same, and the entire device is so constructed as to be very strong and durable.

Having thus described my invention, what I claim, and desire to secure by Letters Patent, is—

The improved hay-press herein described and shown, comprising the parallel beams A A, the standards C, erected on said beams near the centers thereof, the transverse bars E, connecting the standards in pairs, the longitudinal bearing-bars F, secured to and between the said transverse bars, the king-bolt journaled in said bearing-bars, the sweep secured to the upper end of the king-bolt, the drive-wheel secured to the lower end of the king-bolt and having a single depending crank-pin, the press-boxes at the ends of the beams A A, the plungers in said press-boxes, and the pitmen having their outer ends pivoted to the plungers and their inner ends pivoted on the crank-pin of the drive-wheel, all combined and operating substantially as specified.

In testimony that I claim the foregoing as my own I have hereto affixed my signature in presence of two witnesses.

THOMAS T. MAYES.

Witnesses:
A. D. POTTS,
J. Z. MILLER, Sr.